(12) United States Patent
Irvin

(10) Patent No.: US 6,768,909 B1
(45) Date of Patent: Jul. 27, 2004

(54) HANDOFF BETWEEN EXTERNAL AND INTERNAL POSITIONING SYSTEMS

(75) Inventor: David R. Irvin, Raleigh, NC (US)

(73) Assignee: Ericsson, Inc., Research Triangle Park, NC (US)

( * ) Notice: Subject to any disclaimer, the term of this patent is extended or adjusted under 35 U.S.C. 154(b) by 0 days.

(21) Appl. No.: 09/507,554

(22) Filed: Feb. 18, 2000

(51) Int. Cl.[7] ............................................. H04Q 7/20
(52) U.S. Cl. ........................ 455/456.1; 455/456.5; 455/456.6
(58) Field of Search ........................... 455/436, 456, 455/457; 342/357.11; 701/213

(56) References Cited

U.S. PATENT DOCUMENTS

| | | | |
|---|---|---|---|
| 5,327,144 A | | 7/1994 | Stilp et al. |
| 5,422,813 A | | 6/1995 | Schuchman et al. |
| 5,946,611 A | * | 8/1999 | Dennison et al. ............ 455/404 |
| 5,982,324 A | | 11/1999 | Watters et al. |
| 6,038,444 A | * | 3/2000 | Schipper et al. ............. 455/421 |
| 6,061,337 A | * | 5/2000 | Light et al. .................. 370/331 |
| 6,188,351 B1 | * | 2/2001 | Bloebaum ............... 342/357.15 |
| 6,198,930 B1 | * | 3/2001 | Schipper ..................... 455/440 |
| 6,253,087 B1 | * | 6/2001 | Corbett ....................... 455/450 |
| 6,266,529 B1 | * | 7/2001 | Chheda ....................... 455/436 |
| 6,321,090 B1 | * | 11/2001 | Soliman ...................... 455/440 |
| 6,323,803 B1 | * | 11/2001 | Jolley et al. ............ 342/357.03 |
| 6,324,404 B1 | * | 11/2001 | Dennison et al. ............ 455/456 |
| 6,327,471 B1 | * | 12/2001 | Song ............................ 455/440 |
| 6,351,236 B1 | * | 2/2002 | Hasler ..................... 342/357.09 |
| 6,353,412 B1 | * | 3/2002 | Soliman ...................... 342/387 |
| 6,526,283 B1 | * | 2/2003 | Jang ........................ 455/456.5 |

FOREIGN PATENT DOCUMENTS

| | | |
|---|---|---|
| DE | 44 09 178 A1 | 9/1995 |
| WO | WO/99/47943 | 9/1999 |

* cited by examiner

Primary Examiner—William Trost
Assistant Examiner—Marcos Torres
(74) Attorney, Agent, or Firm—Moore & Van Allen PLLC; Steven B. Phillips

(57) ABSTRACT

A method and apparatus for determining the position of a mobile terminal using either an internal positioning system, such as a GPS receiver, or an external positioning system such as an external cellular positioning system. A handoff procedure is used to decide which positioning system is used to calculate the position of the mobile terminal. In one embodiment, the internal positioning system is preferred and the mobile terminal switches to the external positioning system only when the internal system is unavailable, and switches back when the internal system is functioning properly. Alternatively, the external positioning system is preferred and when it is unavailable the mobile terminal switches to the internal positioning system, but switches back to the external system when it is available. In one embodiment, the mobile terminal includes the internal positioning system, a transceiver, and a mobile terminal position controller. The mobile terminal position controller selects between the external and internal positioning systems depending on availability or other factors such as operator preference.

29 Claims, 6 Drawing Sheets

HANDOFF BETWEEN EXTERNAL AND INTERNAL POSITIONING SYSTEMS

BACKGROUND OF THE INVENTION

This invention relates to a method and for determining the position of a mobile terminal operating in environments with internal and external positioning systems.

The position of a mobile terminal can be determined by: (1) an internal positioning apparatus such as a GPS receiver built into the mobile terminal that receives Global Positioning System ("GPS") radio signals transmitted from GPS satellites; and (2) an external positioning apparatus such as a cellular positioning system that computes the position of the mobile terminal by observing time differences among the arrivals of a radio signal transmitted by the mobile terminal at a plurality of observation points, i.e., base stations. The operation of GPS is well known and will not be described further here.

A cellular telephone location system for automatically recording the location of one or more mobile cellular telephones is described in U.S. Pat. No. 5,327,144. The system comprises a central site system operatively coupled to at least three cell sites. Each of the cell sites receive cellular telephone signals and integrate a timing signal common to all the cell sites. The central site calculates differences in times of arrival of the cellular telephone signals arriving among the cell sites and thereby calculates the positions of the cellular telephone producing the cellular telephone signals. The full disclosure of U.S. Pat. No. 5,327,144 is hereby incorporated by reference in its entirety.

A mobile terminal that relies exclusively on the GPS system frequently incurs several problems that can compromise the mobile terminal's ability to determine its position. For example, buildings can obstruct GPS navigational signals and if the mobile terminal moves inside a building the internal GPS receiver will be unable to calculate position information. Also, the GPS receiver imposes a drain on the mobile terminal's battery and can shorten the mobile terminal's standby time.

The external positioning approach relies on an adequate coverage of a cellular positioning system to calculate the position of the mobile terminal. Since the cellular positioning system calculates the position of the mobile terminal by detecting time differences among incoming radio signals transmitted by the mobile terminal, problems will arise if the mobile terminal roams into an area not well served by a cellular positioning system. Also, external positioning is generally expected to be less precise than that provided by an internal GPS receiver due to unknown and variable time-domain jitter and offset introduced by the ambiguities inherent to multipath cellular propagation paths and group delay through the radio frequency ("RF") and intermediate frequency ("IF") paths of external positioning receivers.

SUMMARY OF THE INVENTION

In one aspect of the invention, a method is provided for conducting a handoff procedure between a first positioning system and a second positioning system. The position of a mobile terminal is calculated using the first positioning system. When the first positioning is unable to calculate the position of the mobile terminal, the first positioning system is disengaged. The second positioning system is instructed to engage and calculate the position of the mobile terminal. The status of the first positioning system is monitored. When the first positioning system is able to calculate the position of the mobile terminal, the second positioning system is instructed to disengage and the first positioning system is instructed to engage and calculate the position of the mobile terminal.

In one form, the first positioning system is an external positioning system and the second positioning system is an internal positioning system. In another form, the first positioning system is an internal positioning system and the second positioning system is a external positioning system. In yet another form, the external positioning system is an external cellular positioning system, and the internal positioning system is an internal GPS receiver.

In another aspect of the invention, a mobile terminal includes a transceiver, an internal positioning system, and a mobile terminal position controller. The transceiver is used for communicating via wireless signals with the cellular network. The signals include data regarding the position of the mobile terminal as determined by the external positioning system. The mobile terminal position controller determines the availability of the external and internal positioning systems and selects the other of the positioning systems when one positioning system is unavailable.

In one form, the mobile terminal selects the external cellular positioning system when the battery level is low.

BRIEF DESCRIPTION OF THE DRAWINGS

The following is a brief description of the drawings that are presented for the purposes of illustrating the invention and not for purposes of limiting the same.

DETAILED DESCRIPTION OF THE INVENTION

While the invention will be described in connection with one or more embodiments, it should be understood that the invention is not limited to those embodiments. On the contrary, the invention includes all alternatives, modifications, and equivalents as may be included within the spirit and scope of the appended claims.

It should be understood that the term "mobile terminal", as used in the context of the invention, applies to any device capable of communicating with a cellular system. Examples of such mobile terminals include a cellular telephone. Other examples include any device that has been modified or designed to communicate with a cellular network including, but not limited to: a personal digital assistant ("PDA") such as a web ready PDA, a vehicle tracking device, and a laptop computer with cellular connect capability.

Figure 1:
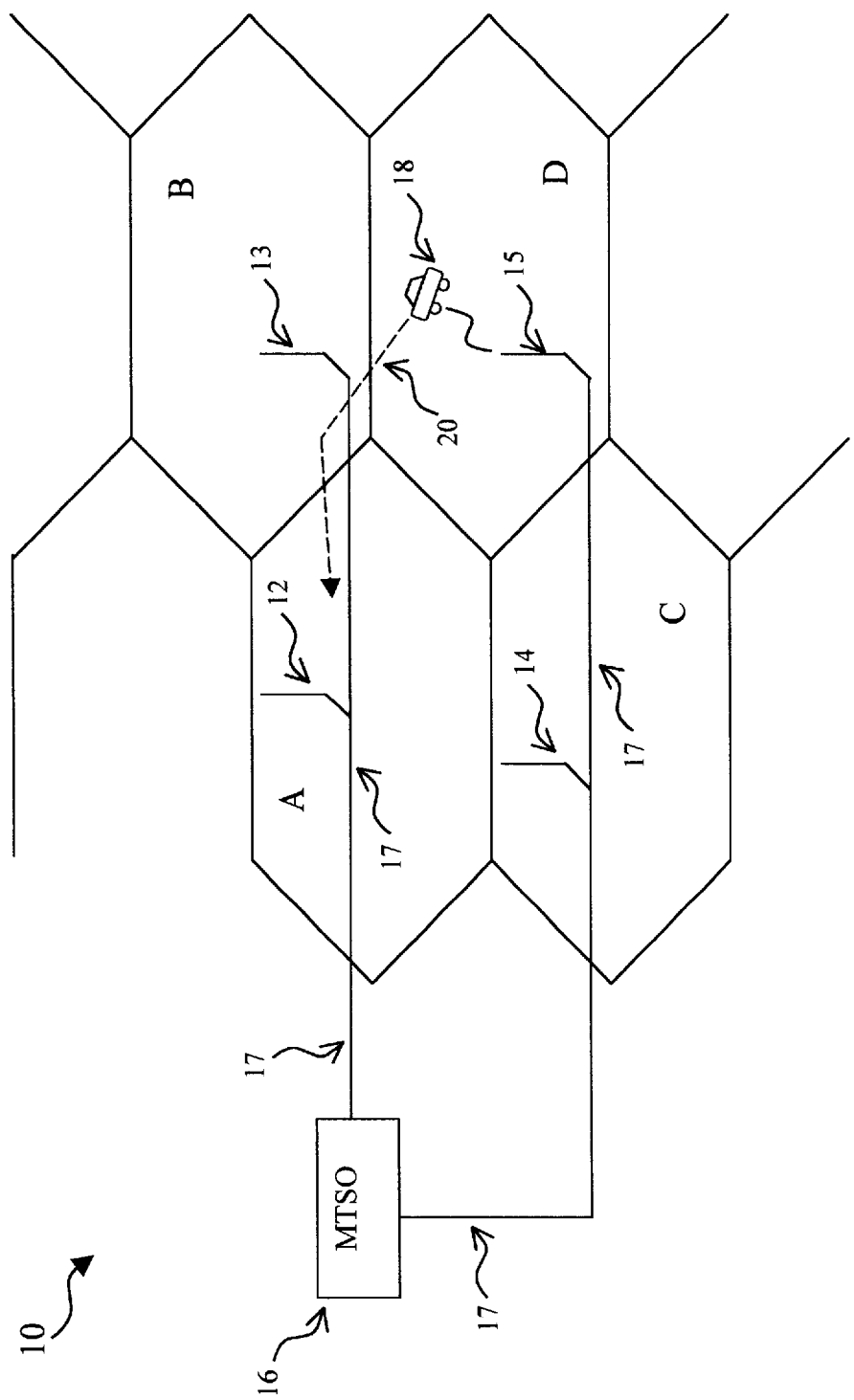
FIG. 1 is a perspective view of a cellular mobile telecommunication system according to the prior art.

Referring initially to FIG. 1, a public cellular system 10 of conventional construction is illustrated. The cellular system 10 is defined by plural cells, including representative cell locations A, B, C and D. Each cell A–D includes a respective base station 12, 13, 14, and 15. Each of the base stations 12–15 communicates with a mobile terminal switching office 16 via intercellular trunks 17. A mobile terminal, represented at 18, may include, for example, a cellular phone, carried by a user in an automobile. However, as is apparent, the mobile terminal 18 may comprise any known form of mobile terminal capable of communicating with a public cellular system 10.

The public cellular system 10 is operable to select from one of the base stations 12–15 to process a call with mobile terminal 18. As illustrated, the mobile terminal 18 is located in cell location D. Consequently, a cellular channel associated with base station 15 would handle the call in progress. If the mobile terminal 18 were stationary, then the call would likely be handled until completion by the base station 15. However, if the mobile terminal is moving, then it could cross into different cells. For example, as illustrated, the mobile terminal 18 might be moving in a direction as indicated by the dashed line 20 and traverse into cell location B and subsequently cell location A. A typical cellular mobile telecommunication system 10 utilizes handoffs to hand a call off from a channel of the base station 15 to a channel of the base station 13 and subsequently from the base station 13 to the base station 12, as the mobile terminal traverses from cell location D to respective cell locations B and A.

The cellular telecommunication apparatus 10 does not itself form part of the invention. Instead, the invention relates to a mobile terminal positioning apparatus operating in conjunction with a cellular network comprising of a plurality of cells. Specifically, the invention relates to a handoff procedure between an internal and external positioning apparatus. For example, a mobile terminal using its internal GPS receiver to calculate its position may roam into a building that blocks the GPS satellite signals and the mobile terminal responds by disengaging its internal GPS receiver and engaging the external cellular positioning apparatus to calculate its position.

A handoff between the internal and external positioning apparatus also occurs when a mobile terminal has engaged the external cellular positioning apparatus of a first cell and roams into a neighboring cell that lacks this apparatus. The mobile terminal disengages the external positioning apparatus of the first cell and engages its internal GPS receiver when it roams into the neighbor cell that lacks an external positioning apparatus.

A handoff also occurs when the mobile terminal is using the external positioning apparatus of a first cell and roams into a second cell that also has an external positioning apparatus. As the mobile terminal roams from the first cell and into the second cell, the mobile terminal disengages the external positioning apparatus of the first cell and engages the external positioning apparatus of the second cell.

The words "system" and "apparatus" shall hereafter be interpreted as equivalent terms. The terms "external cellular positioning system" and "external positioning system" are regarded as equivalent terms. The terms "internal GPS receiver" and "internal positioning system" are regarded as equivalent terms. Further, it should be understood that the internal GPS receiver includes the capability to receive GPS satellite signals and calculate the position of the mobile terminal.

It should be understood that the terms "internal positioning system" and "built in GPS receiver" are only used herein for purposes of clear description. Specifically, the internal positioning system may be attached to a mobile terminal. For example, the GPS receiver may be clipped onto the mobile unit or attached in other ways to the mobile terminal. Therefore, the terms "internal positioning system" and "built in GPS receiver" hereby include a GPS receiver attached operably to a mobile terminal 18.

Figure 2:
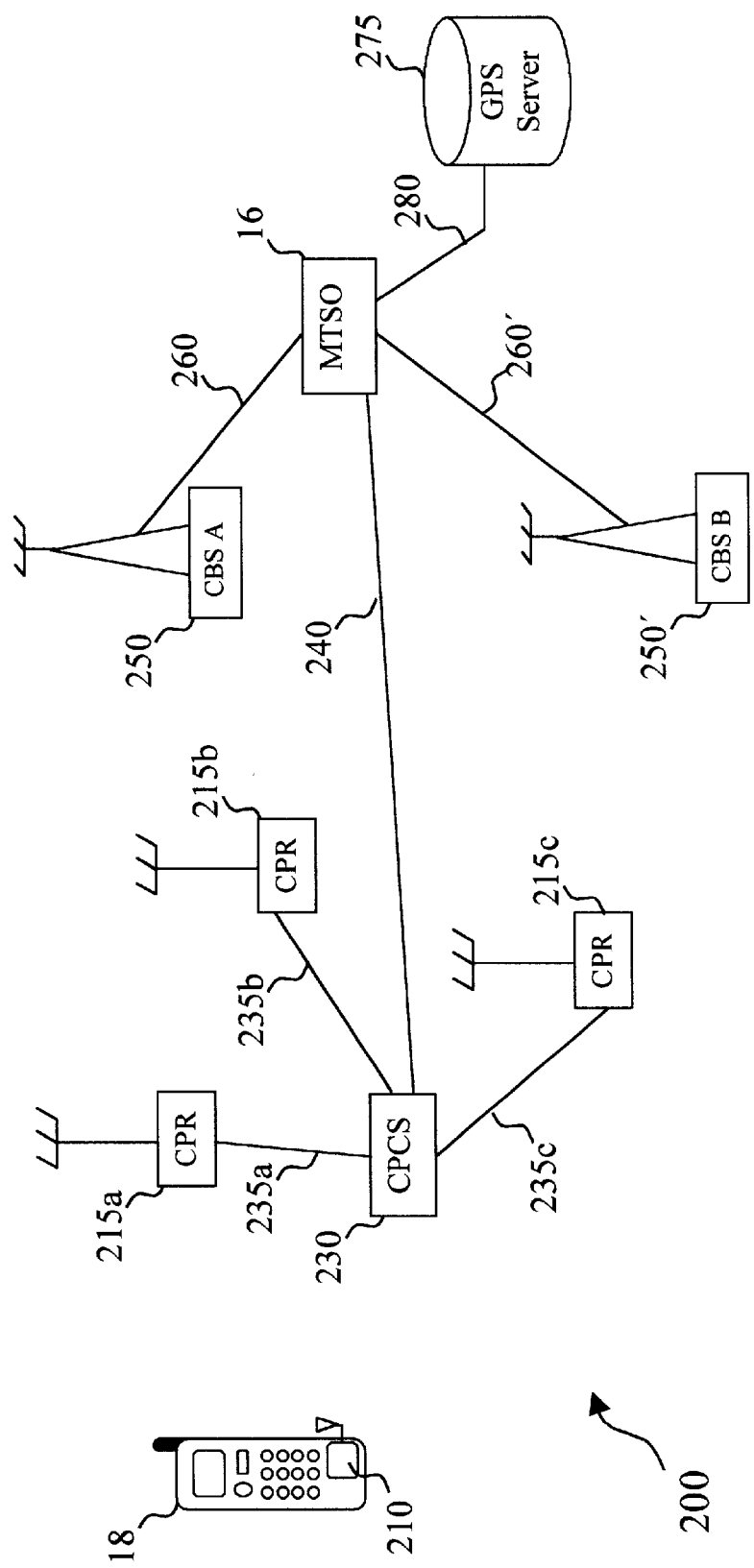
FIG. 2 is a schematic view of an external cellular positioning system.

FIG. 2 is a schematic view of an external cellular positioning system 200. The cellular positioning system 200 includes a plurality of cellular positioning receivers ("CPR") 215a, 215b, and 215c, which monitor transmissions from at least one mobile terminal 18. A central positioning control site ("CPCS") 230 gathers information from the cellular positioning receivers 215a, 215b, and 215c, via communication lines 235a, 235b, and 235c. The communication lines are typically wire links. The central positioning control site 230 analyzes the information received from the plurality of cellular positioning receivers and calculates the position of the at least one mobile terminal 18. The at least one mobile terminal 18 includes an internal GPS receiver 210. The terms "mobile terminal" and "at least one mobile terminal" will hereafter be regarded equivalent terms.

In FIG. 2 the central positioning control site ("CPCS") 230 is shown connected to a mobile terminal switching office ("MTSO") 16 by means of the communication line 240. Optionally, mobile terminal position data calculated by the central positioning control site 230 is broadcast to a mobile terminal 18 via a cellular base station ("CBS") represented by cellular base stations A and B at 250 and 250', respectively. When desired the cellular base stations provide a wireless link to the at least one mobile terminal 18. The cellular base stations 250 and 250' are connected via wire links 260 and 260', respectively, to the mobile telephone switching office 16.

An optional GPS server 275 is connected to the mobile telephone switching office 16 via communication link 280. The optional GPS server 275 stores information that can be broadcast to the at least one mobile terminal 18, via a cell base station such as 250', to facilitate the internal GPS receiver 210 to identify which GPS satellite signals to use to get a position fix for the at least one mobile terminal 18. For example, the optional GPS server 275 can monitor the position data provided by the central positioning control site 230 and when the at least one mobile terminal 18 disengages the external cellular positioning system 200 and engages the internal GPS receiver 210, the optional GPS server 275 uses the latest position data to calculate which GPS satellites offer the highest probability for obtaining a first position fix, and sends this information to the at least one mobile terminal 18 via a cell base station such as 250'.

It should be understood that the external positioning system 200 depicted in FIG. 2 might vary. For example, a cell base station (such as 250) could be connected directly to and co-located with the central positioning control site 230. Alternatively, a cellular positioning receiver (such as 215a) might be co-located with and connected directly to a cell base station such as 250'. The term "co-located" as used here refers to a shared or common geographical location such as a central positioning control site and a base station sharing the same location.

It should also be understood that the mobile terminal's internal GPS receiver 210 (see FIG. 2) may fail to function for a variety of reasons. For example, the mobile terminal 18 may be taken onto an underground railway or into a building that results in temporary blockage of the GPS satellite signal. In such circumstances the internal GPS receiver 210 will not be able to compute the position of the mobile terminal 18 and the mobile terminal 18 will utilize the external cellular positioning system represented as 200 in FIG. 2.

The cellular positioning system 200 is illustrated only to provide a general context for the present invention. As previously noted, the present invention is directed to a mobile terminal with an internal positioning system, an external cellular positioning system, and to a handoff procedure between the external and internal positioning apparatus.

Figure 3A:
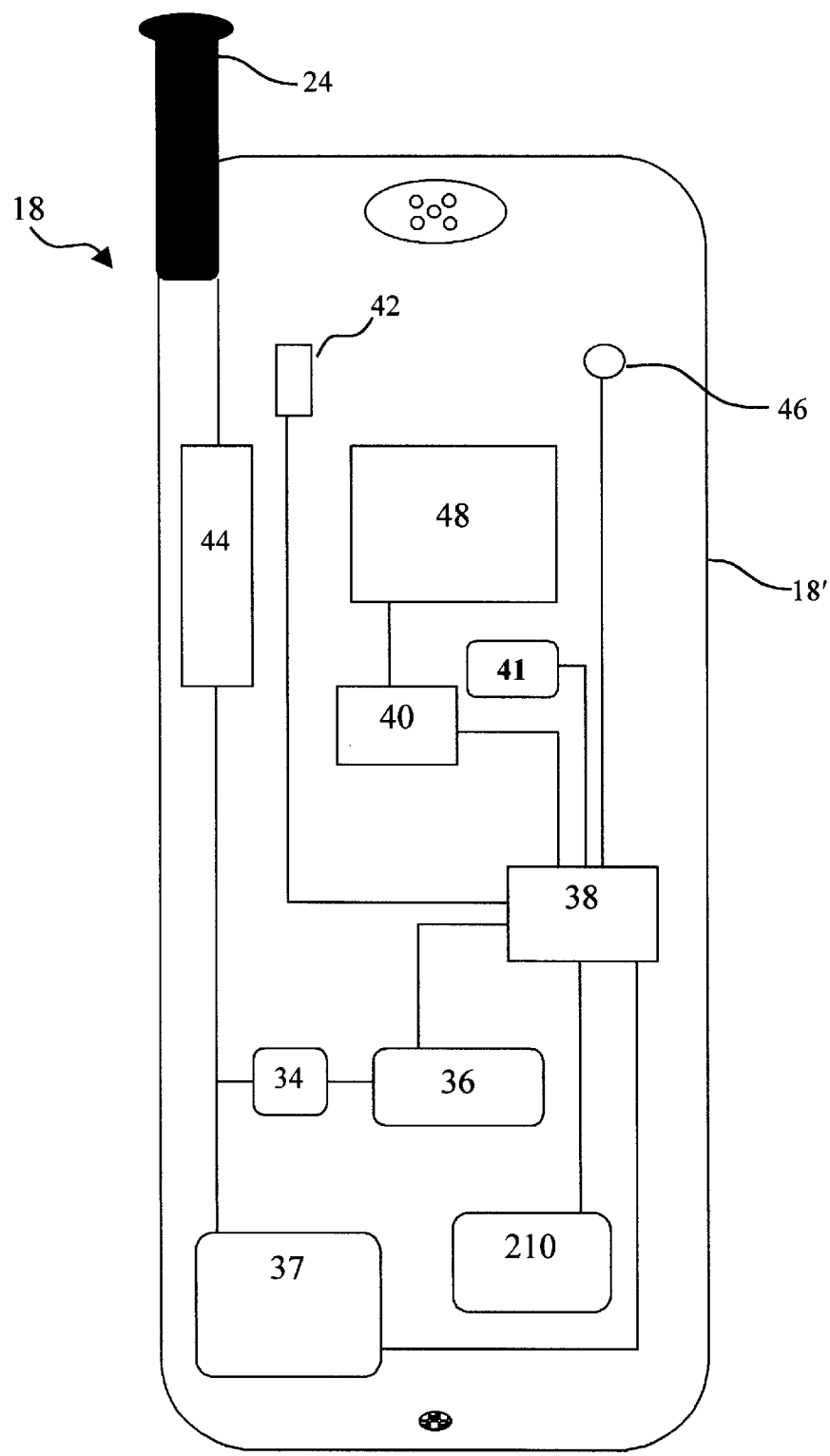
FIG. 3a is a block diagram of a mobile terminal equipped to track or calculate its position.

FIG. 3a shows a mobile terminal 18, represented here as a cellular phone 18', according to one embodiment of the invention. An antenna 24 is connected to a transceiver 44. The transceiver 44 is further connected to a position data filter 34 and a mobile terminal controller 37. The position data filter 34 is further connected to an external position data processor 36. The external position data processor 36 is further connected to a mobile terminal position controller 38, which is also connected to the mobile terminal controller 37, the internal GPS receiver 210, a battery monitor 40, a periodic registration timer 41, a toggle preference switch 42, and a light emitting diode ("LED") 46. The battery monitor 40 is further connected to a battery 48 that powers the mobile terminal 18.

Incoming wireless signals are processed by the transceiver 44 and outputted to the mobile terminal controller 37 and position data filter 34. The mobile terminal controller 37 handles the processes normally associated with the running of a mobile terminal such as a cell phone 18' and shall not be discussed further here. Optionally, when the external cellular positioning system 200 is engaged, the position data filter 34 extracts position data originating from a central positioning control site 230, and forwards the filtered position data to the external position data processor 36. The external position data processor 36 tracks the position of the mobile terminal 18 based on the position data originally calculated by a central positioning control site 230, and keeps the mobile terminal position controller 38 updated.

When the external cellular positioning system 200 is disengaged, the mobile terminal position controller 38 receives position data from the internal GPS receiver 210. As described further below, depending on the status of the external and internal positioning systems 200 and 210, the position of the toggle preference switch 42 and updates from the battery monitor 40, the mobile terminal position controller 38 decides which, if any, of the two positioning systems to engage. Optionally, the status of the external cellular positioning system 200 is monitored by the external position data processor 36 and reported to the mobile terminal position controller 38.

It should be clearly understood that the external position data processor 36 does not calculate the position of the mobile terminal 18. Instead, the external position data processor 36 extracts position data from incoming wireless signals. A central positioning control site 230 calculates the position data of the mobile terminal 18 and relays the position data to the mobile terminal 18 via a cellular base station 250 (see FIG. 2).

The battery monitor 40 checks the level of charge remaining in a battery 48. The toggle preference switch 42 toggles between two positions so that a user can select a first position indicating a preference for the internal GPS receiver 210, and a second position indicating a preference for the cellular positioning system 200 to calculate the location of the mobile terminal 18. If the toggle switch 42 is in neither the first or second position, this indicates that the user does not have a preference, which is treated here as the "default preference", for either the internal GPS receiver 210 or the cellular positioning system 200.

Still referring to FIG. 3a, the mobile terminal position controller 38 monitors the battery monitor 40, the toggle switch 42, the internal GPS receiver 210, and the external position data processor 36. The mobile terminal position controller 38 arrives at a decision depending on whether: (1) the internal GPS receiver 210 or the external position data processor 36 are engaged; (2) the status of the battery monitor 40, and (3) the position of the toggle preference switch 42. Table 1 lists the factors leading to the decisions made by the mobile terminal position controller 38.

For the purpose of clear description and with respect to Tables 1 to 3, it should be understood that when the internal GPS receiver 210 (column two of Tables 1, 2 and 3) is reporting a positive status "+" to the mobile terminal position controller 38, this only means that the internal GPS receiver 210 is able to calculate the position of the mobile terminal 18 and does not indicate whether the internal GPS receiver 210 is currently engaged or not engaged by the mobile terminal position controller 38. Likewise, when the external position data processor 36 is reporting a positive status (column three of Tables 1 to 3) to the mobile terminal position controller 38, this only means that the external position data processor 36 is able to process position data originating from a central positioning control site 230 and track the position of the mobile terminal 18, and does not signify that the external cellular positioning system 200 or the external position data processor 36 is currently engaged or disengaged by the mobile terminal position controller 38. The positioning system that is engaged by the mobile terminal position controller 38 is found in the final column with the heading "Mobile terminal position controller 38", i.e., columns six, four, and four with respect to Tables 1, 2 and 3, respectively.

It should be understood further understood that "+/−" signifies that the mobile terminal position controller 38 shall disregard the current status of the respective positioning system. For example in scenario #6 in Table 1, the battery level monitor 40 is reporting a very low battery charge ("−") forcing the mobile terminal position controller 38 to disregard the current status of both the GPS receiver 210 and the external position data processor 36, and the position of the toggle preference switch 42.

In scenario #2 in Table 1 the internal GPS receiver 210 is reporting a negative status (meaning it is not able to calculate the position of the mobile terminal 18 [represented by "−"]), the external position data processor 36 is reporting a positive status (represented by "+"), the battery level monitor 40 is reporting a good charge on the battery, and the toggle preference switch 42 is set to default (represented by "D"). With these status parameters the mobile terminal position controller 38 engages the external position data processor 36 (represented by "E") to process the information received from the central positioning control site 230, and the mobile position controller 38 continues to monitor the internal GPS receiver 210 (represented by "MG") to detect any change in operational status of the internal GPS receiver 210.

In scenario #4 in Table 1 the battery level monitor 40 is reporting a low charge. With a low battery condition the options available to the position controller are limited. The mobile terminal position controller 38 shall disregard the status of the internal GPS 210 and the position of the toggle preference switch 42. The mobile terminal position controller 38 shall engage the external cellular positioning system 200 if the external position data processor 36 is reporting a positive status. This scenario assumes that the internal GPS receiver 210 requires more power than the external position data processor 36. Should the battery 48 be replaced with a charged unit, the battery level monitor would report a good charge and the mobile terminal position controller 38 would decide which positioning system to engage and or disengage according to the position of the toggle preference switch 42.

TABLE 1

| Scenario # | GPS receiver 210 | External position data processor 36 | Battery Level Monitor 40 | Toggle preference switch 42 | Mobile terminal position controller 38 engagement and monitoring instruction |
|---|---|---|---|---|---|
| 1 | + | + | + | D | E' or G' |
| 2 | − | + | + | D | E' and $M_G$ |
| 3 | − | − | + | D/E/G | L and $M_{EG}$ |
| 4 | +/− | + | low | D/E/G | E' and $M_G$ |
| 5 | +/− | − | low | D/E/G | Ø and L (if battery charge permits L) |
| 6 | +/− | +/− | − | D/E/G | Ø |
| 7 | + | + | + | E | E' |
| 8 | − | + | + | E | E' |
| 9 | + | + | + | G | G' |
| 10 | + | − | + | G | G' |

Abbreviations that apply, where used, to Tables 1, 2, 3, 4 and 5:
*L = Flashing LED 46 that warns the user that the location of the mobile terminal is not being calculated by the internal GPS receiver 210 or the external cellular positioning system 200; D = Default; E = External position data processor 36; G = GPS receiver 210; $M_{EG}$ = Monitor the external position data processor and the internal GPS receiver 210; $M_E$ = Monitor the external position data processor 36; $M_G$ = Monitor the internal GPS receiver 210; E' = engage the external celluar positioning system 200; G' = engage the internal GPS receiver 210; and Ø = null engagement wherein neither of the positioning systems 200 or 210 are engaged.

In another embodiment of the invention, the battery level monitor 40 and toggle preference switch 42 are optional. Table 2 describes the possible outcomes in the absence of the two components 40 and 42.

TABLE 2

| Scenario # | GPS receiver 210 | External position processor 36 | Mobile terminal position controller 38 engagement and monitoring instructions |
|---|---|---|---|
| 1 | + | + | E' or G' |
| 2 | − | + | E' and $M_G$ |
| 3 | + | − | G' and $M_E$ |
| 4 | − | − | L and $M_{EG}$ |

In another embodiment of the invention, the battery level monitor 40, toggle preference switch 42, and LED 46 are optional. Table 3 describes the possible outcomes in the absence of the battery monitor 40 and LED 46.

TABLE 3

| Scenario # | GPS receiver 210 | External position processor 36 | Mobile terminal position controller 38 engagement and monitoring instructions |
|---|---|---|---|
| 1 | + | + | E' or G' |
| 2 | − | + | E' and $M_G$ |
| 3 | + | − | G' and $M_E$ |
| 4 | − | − | $M_{EG}$ |

In another embodiment of the invention the mobile terminal position controller 38 monitors both the internal GPS receiver 210 and external position processor 36 regardless of whether either are engaged or disengaged by the mobile terminal position controller 38. In this embodiment, the mobile terminal position controller 38 monitors the internal GPS receiver 210 and the external position data processor 36 on a constant or cyclical basis. Alternatively, the internal GPS receiver 210 and the external position data processor 36 are configured to alert the mobile terminal position controller 38 when a change in their status occurs.

The mobile terminal position controller 38 preferably monitors the optional battery level monitor 42 on a constant or cyclical basis. Alternatively, the battery level monitor 42 may be configured to alert the mobile terminal position controller 38 whenever a change in the status of the battery 48 is detected such as from good charge to low charge and vice versa.

The LED 46, if present, could be replaced with any suitable mechanism such as a custom icon on a compact screen, or a bit mapped icon on a compact pixel display, or even an audio alert. Likewise, the toggle preference switch 42 is replaceable with any suitable equivalent mechanism such as an interactive touch-sensitive screen that allows the user to select a preference between the internal GPS receiver 210 and the external cellular positioning system 200 (and by default the external position data processor 36).

When the mobile terminal 18 is using its internal GPS receiver 210, the position data calculated by the internal GPS receiver 210 can be used to assist emergency services. This applies particularly if the mobile terminal is a cell telephone 18' that is being used to make an emergency call. In one embodiment the position data is displayed on a pixel display of a cell phone 18 for a user to read and provide to the emergency service. Alternatively, the cell phone 18' transmits the position data automatically. Other types of mobile terminal 18 such as a tracking device fitted to a road vehicle would rely on automatically transmitting position data via the cellular system 10 to a designated receiving station. Alternatively, the position data calculated by the central positioning control site 230 is directly communicated to the emergency services or to a designated receiving station.

It should be understood that several of the components described in the context of FIG. 3a may be performed in software and could be integrated. For example, the separate functions of the position data filter 34 and external position data processor 36 could be integrated and carried out on a single integrated processor. Likewise, the mobile terminal position controller 38 could be integrated with the position data filter 34 and external position data processor 36 and further integrated with the mobile terminal controller 37. Alternatively, the mobile terminal controller 37 could be integrated with the mobile terminal position controller 38. Also, the mobile terminal controller 37 could directly monitor the availability and/or position data calculated by the external cellular positioning system 200 thereby making the position data filter 34 and external position data processor 36 redundant. Thus, the embodiment described in the context of FIG. 3a should not be regarded as exhaustive or limiting the invention in any way.

In one embodiment of the invention, the mobile terminal controller 37 directly monitors the availability and/or position data calculated by the external cellular positioning system 200 (i.e., the central positioning control site 230 is calculating the position of the mobile terminal 18). The mobile terminal controller 37 keeps the mobile terminal position controller 38 updated thereby making the position data filter 34 and external position data processor 36 redundant. In this embodiment, the battery level monitor 40, toggle preference switch 42, and LED 46 are also optional. The symbols in column 3 of Table 4 indicates that the mobile terminal controller 37 is reporting that the central positioning control site 230 (FIG. 2) is calculating the position of the mobile terminal 18. Conversely a "–" in column 3 indicates the central positioning control site 230 is not calculating the position of the mobile terminal 18. Table 4 describes the possible engagement and monitoring instructions issued by the mobile terminal position controller 38 (column 4).

TABLE 4

| Scenario # | GPS receiver 210 | Central positioning control site ("CPCS") 230 | Mobile terminal position controller 38 engagement and monitoring instructions |
| --- | --- | --- | --- |
| 1 | + | + | E' or G' |
| 2 | – | + | E' and $M_G$ |
| 3 | + | – | G' and $M_E$ |
| 4 | – | – | $M_{EG}$ |

In another embodiment of the invention, the functionality of the mobile terminal position controller 38, the position data filter 34, and external position data processor 36 are incorporated into the mobile terminal controller 37. In this embodiment, the battery level monitor 40, toggle preference switch 42, and LED 46 are optional. Table 5 describes the possible engagement and monitoring instructions issued by the mobile terminal controller 37 (column 4).

TABLE 5

| Scenario # | GPS receiver 210 | Central positioning control site ("CPCS") 230 | Mobile terminal position controller 37 engagement and monitoring instructions |
| --- | --- | --- | --- |
| 1 | + | + | E' or G' |
| 2 | – | + | E' and $M_G$ |
| 3 | + | – | G' and $M_E$ |
| 4 | – | – | $M_{EG}$ |

Figure 3B:
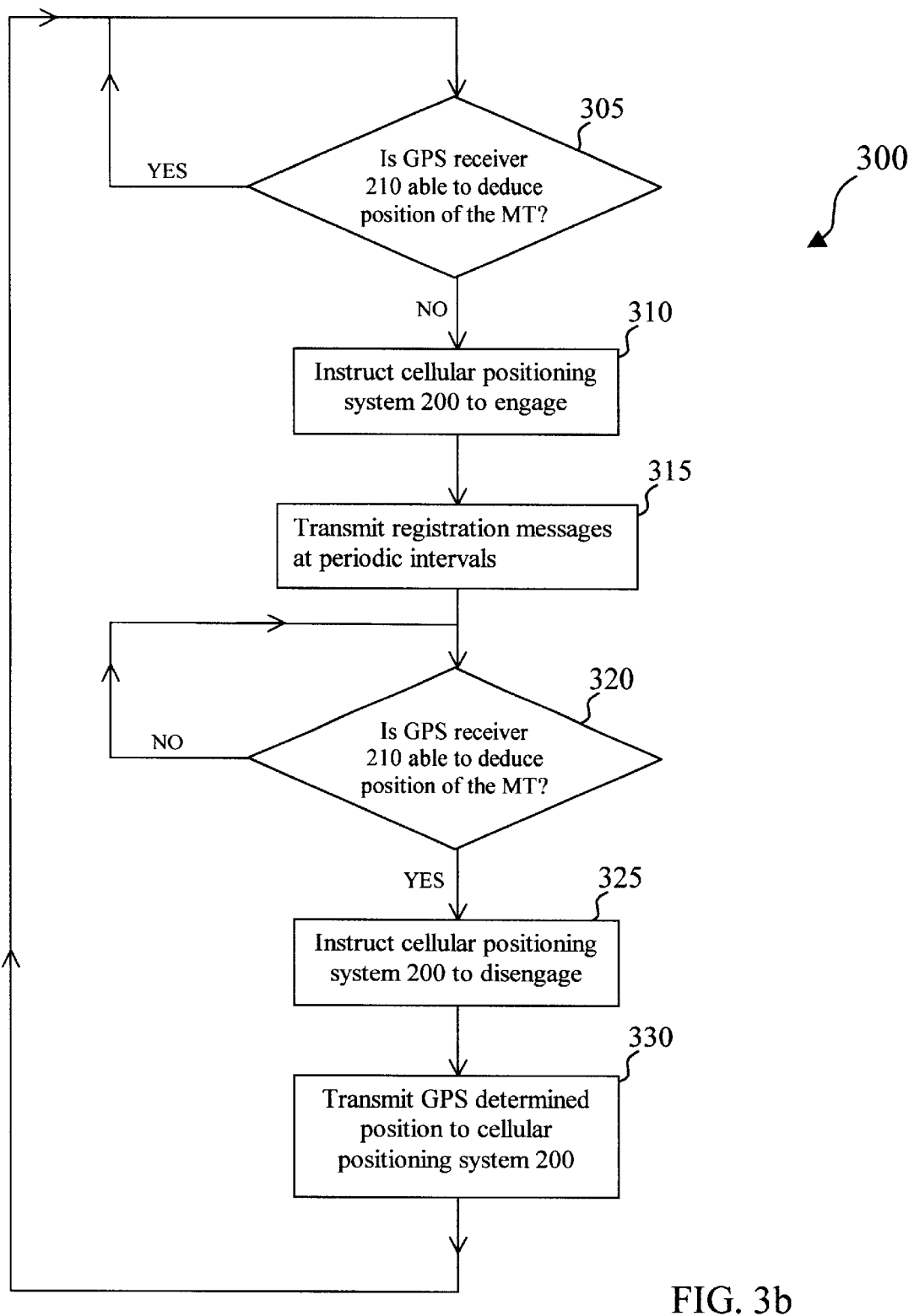
FIG. 3b shows a flow chart that depicts the logical steps involved in determining the position of a mobile terminal inside a cell according to one embodiment of the invention.
Figure 3C:
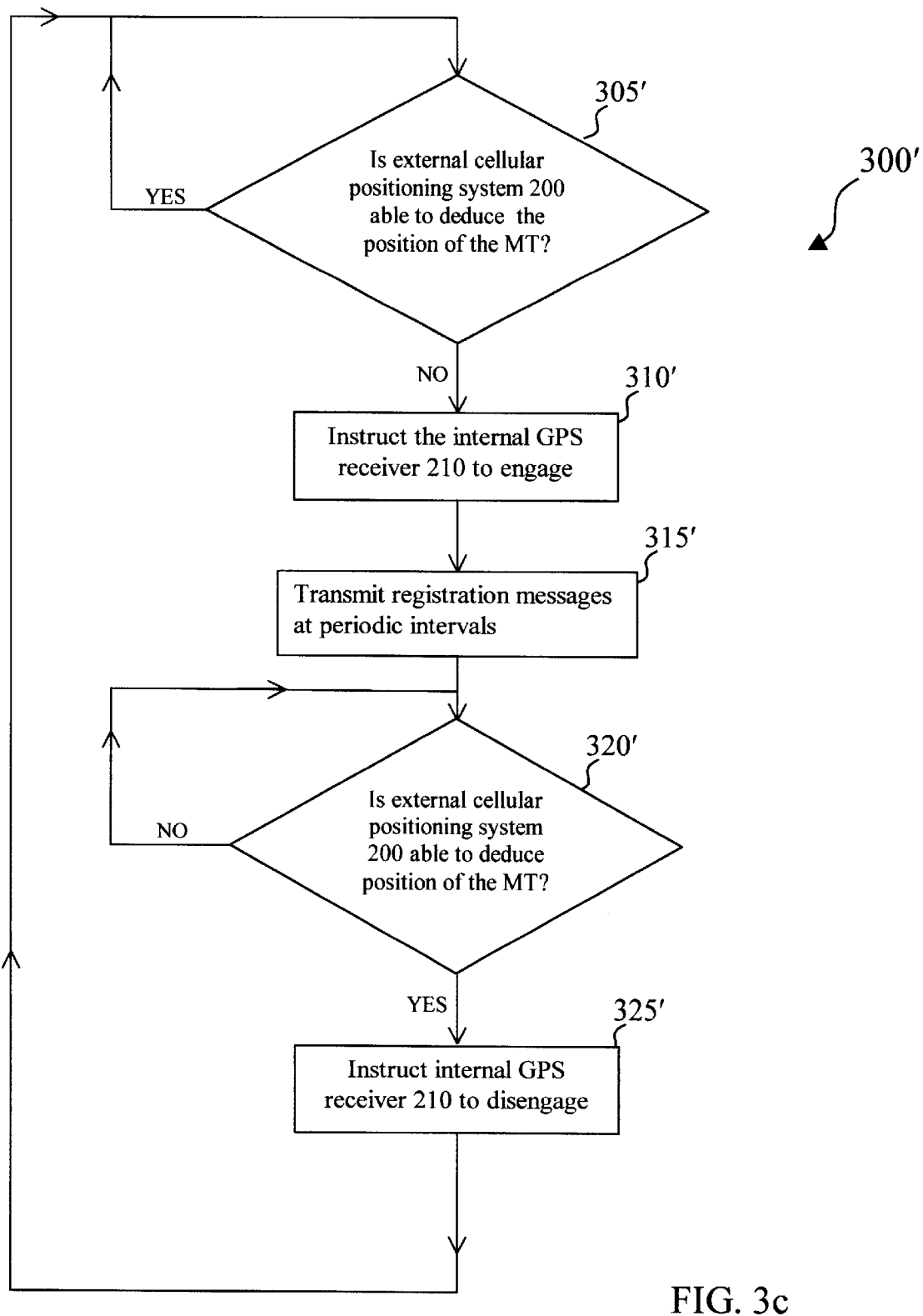
FIG. 3c shows a flow chart that depicts the logical steps involved in determining the position of a mobile terminal inside a cell according to another embodiment of the invention.

The mobile terminal position controller 38 can optionally activate and set the periodic registration timer 41 to particular time intervals at 315 (FIG. 3b) and 315' (FIG. 3c).

FIG. 3b shows a flow chart 300 that depicts the logical steps involved in determining the position of a mobile terminal ("MT") inside a cell according to one embodiment of the invention. In this embodiment the internal positioning system 210 is the default (or the toggle switch 42, if present, is in the position indicating that the user prefers the internal GPS receiver 210). The mobile terminal position controller 38 monitors the status of the internal GPS receiver 210 at 305. When the mobile terminal position controller 38 detects failure of the internal GPS receiver 210, the mobile terminal sends an instruction message, at 310, to instruct the external cellular positioning system 200 to engage and track the mobile terminal 18. This message can be sent by the mobile terminal 18 to a cellular base station 250 over a channel such as a random access control channel ("RACCH"), a fast access control channel ("FACCH"), slow access control channel ("SACCH") or other communication means well known in the art, such as a short message of a short message service ("SMS"), that is suitable for carrying a brief data message such as a datagram. The RACCH, FACCH, and SACCH are typically provided by the cellular system.

Still referring to FIG. 3b, after sending the instruction message at 310, the mobile terminal 18 updates an inbuilt periodic-registration timer at 315. By changing the periodic-registration timer a registered but inactive mobile terminal 18 can periodically transmit an "I'm here" message to remind the external cellular positioning system 200 of its presence. For example, the periodic-registration timer can be set to thirty minutes thus causing the mobile terminal 18 to transmit an "I'm here" message every thirty minutes to a base station to enable the external positioning system to calculate the mobile terminal's position on a thirty-minute cycle. If the timer is set to five, ten, fifteen, twenty, twenty five thirty, thirty five, or forty minutes, then an "I'm here" message is transmitted from the mobile terminal 18 to the cellular positioning system on a five, ten, fifteen, twenty, twenty five, thirty, thirty five, forty minute cycles, respectively.

If the internal GPS receiver is. Enable to calculate the position of the mobile terminal then the "I'm here" messages are periodically transmitted and the mobile terminal continues to rely on the external cellular positioning system 200. However, if the mobile terminal position controller 38 determines that the GPS receiver is able to calculate the position of the mobile terminal 18, a message is sent to the external cellular positioning system 200 to disengage at 325. The mobile terminal's internal GPS receiver 210 is engaged by the mobile terminal position controller 38, and calculates the position of the mobile terminal and periodically updates the external cellular positional system 200 with the position of the mobile terminal 18 at 330. The mobile terminal 18 then resumes monitoring its GPS receiver 210 at 305 as described above.

The periodic transmission of positional data from the mobile terminal 18 to the external cellular positioning system 200 at 330 enables the external positioning system 200 to calibrate its own equipment as described in a co-pending U.S. patent application (Ser. No. 08/838,027) filed Apr. $22^{nd}$, 1997 entitled "A Cellular Positioning System That Compensates for Received Signal Delays In Positioning Radio Receivers."

In another aspect of the invention, the periodic transmission of registration messages at 315 and/or the transmission of GPS determined position data at 330 are optional.

FIG. 3c shows a flow chart 300' that depicts the logical steps involved in determining the position of a mobile terminal ("MT") 18 inside a cell according to an alternative embodiment of the invention. In this embodiment the external cellular positioning system 200 is the default (or the toggle switch 42, if present, is in the position indicating that the user prefers the external cellular positioning system 200). The mobile terminal position controller 38 monitors the status of the external cellular positioning system 200 at 305'. When the mobile terminal position controller 38 detects that the external cellular positioning system 200 is unable to calculate the position of the mobile terminal 18, or upon explicit command by the external cellular positioning system 200, the mobile terminal position controller 38 sends an instruction message at 310' to instruct the internal GPS receiver 210 to engage and calculate the position of the mobile terminal 18. The mobile terminal position controller 38 adjusts the periodic-registration timer 41 at 315' to force the mobile terminal 18 to broadcast registration messages more frequently in order to determine the status of the external cellular positioning system 200. When the mobile terminal position controller 38 at 320' determines that the external cellular positioning system 200 is able to calculate position data, or upon explicit command by the external cellular positioning system 200, the mobile terminal position controller 38 instructs the internal GPS receiver 210 at 325' to disengage and instructs the external position data processor 36 to begin reporting position data sent by the external cellular position system 200.

As is well known, a mobile terminal 18 can roam from one cell into another cell resulting in a cell-to-cell handoff. Unfortunately, in some systems the distribution of cellular positioning systems is not adequate throughout the cellular telephone network. Problems can arise if the mobile terminal 18 roams from a cell that is well equipped with a cellular positioning system and roams into a cell that lacks a cellular positioning system. Another embodiment (FIG. 4) of the invention is directed to dealing with the problem of uneven distribution of the external cellular positioning system.

Figure 4:
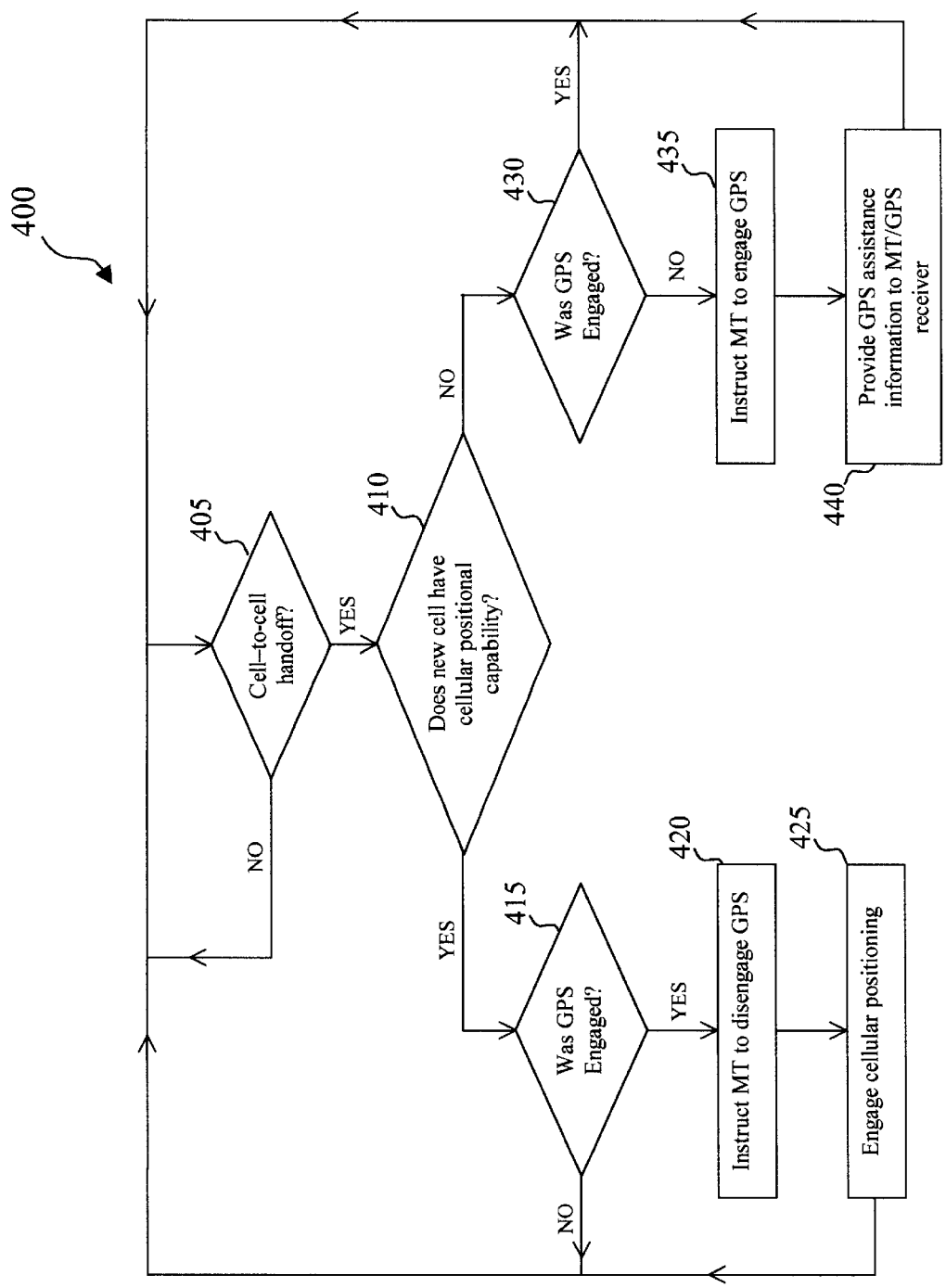
FIG. 4 shows a flow chart that depicts the logic steps involved in determining the position of the mobile terminal from the perspective of a cell-to-cell handoff.

Referring to FIG. 4, a flow chart 400 depicts the logic steps involved in determining the position of the mobile terminal 18 from the perspective of a cell-to-cell handoff. The external cellular, positioning system 200 and/or the mobile terminal's position controller 38 (see FIG. 3a), in conjunction with the mobile terminal controller 37, monitors for a cell-to-cell handoff at 405. Once a cell-to-cell handoff is detected at 405 a mobile terminal switching office 16 explicitly notifies the mobile terminal 18 at 410 (e.g., by way of a control channel via a base station 250) whether the new cell (i.e., the cell assuming control as a result of the handoff) has a cellular positioning system 200.

Alternatively, the mobile terminal 18 may determine (e.g., from broadcast messages) whether the new cell has an external cellular positioning system 200. If the new cell has a cellular positional capability, a check is made at 415 to verify if the mobile terminal's internal GPS receiver 210 was engaged just prior to the cell-to-cell handoff. If the internal GPS receiver 210 is engaged, then the mobile terminal 18 disengages the GPS system at 420 and engages the external cellular system at 425 after which it continues to monitor for cell-to-cell handoff. If the verification check at 415 determined that the internal GPS system was not engaged, then the mobile terminal 18 should remain in communication with the external cellular positioning system 200 and revert to monitoring for a cell-to-cell handoff at 405.

In contrast, if the verification check at 410 (FIG. 4) confirms that the new cell does not have cellular positional capability then a check is made at 430 to confirm if the internal GPS receiver 210 was engaged. If the check at 430 confirms that the GPS receiver 210 was engaged just prior to the cell-to-cell handoff, then the GPS receiver 210 is kept in an operative state and the mobile terminal 18 continues to monitor for the next cell-to-cell handoff at 405. If the check at 430 instead confirms that the internal GPS receiver 210 was disengaged, then the internal GPS receiver 210 is instructed to engage at 435.

Optionally, a GPS server (275 in FIG. 2) attached to a mobile terminal switching office (16 in FIG. 2) enables the internal GPS receiver 210 to quickly find a first position-fix for the mobile terminal 18 by providing GPS assistance data. The optional GPS server 275 monitors the position data calculated by the central positioning control site 230 and when the mobile terminal 18 disengages the external cellular positioning system 200 and engages the internal GPS receiver 210, the optional GPS server 275 uses the latest position data calculated by the central positioning control site 230 to calculate which GPS satellites offer the highest probability for the mobile terminal 18 to obtain a first position fix, and sends this information at 440 (FIG. 4) to the mobile terminal 18 via a cell base station such as 250' (see FIG. 2).

It should be understood that while the mobile terminal 18 is monitoring for cell-to-cell handoff, the mobile terminal position controller 38 continues to engage either the internal GPS receiver 210 or the external cellular positioning system 200 to calculate the position of the mobile terminal 18 (see FIGS. 3b and 3c).

While the invention is described above in connection with preferred or illustrative embodiments, these embodiments are not intended to be exhaustive or limiting of the invention. Rather, the invention is intended to cover all alternatives, modifications and equivalents included within its spirit and scope of the invention, as defined by the appended claims.

I claim:

1. A method for conducting a handoff procedure between positioning systems used in determining a position for a mobile terminal in a cellular network, the method comprising:

disengaging a first positioning system when said first positioning system is unable to calculate the position of said mobile terminal;

instructing a second positioning system to engage and calculate the position of said mobile terminal; and monitoring said first positioning system and, when said first positioning system is able to calculate the position of said mobile terminal, instructing the second positioning system to disengage and instructing said first positioning system to engage and calculate the position of said mobile terminal;

wherein one of said first positioning system and said second positioning system is an internal positioning system which calculates the position at the mobile terminal using radio signals from satellites, and the other of said first positioning system and said second positioning system is an external positioning system which calculates the position based on arrivals of a radio signal from the mobile terminal at a plurality of base stations.

2. The method according to claim 1, wherein said first positioning system is an external positioning system and said second positioning system is an internal positioning system.

3. The method according to claim 2, wherein said external positioning system is an external cellular positioning system.

4. The method according to claim 2, wherein said internal positioning system is an internal GPS receiver.

5. The method according to claim 2, wherein said external positioning system is an external cellular positioning system, and said internal positioning system is an internal GPS receiver.

6. The method according to claim 5, wherein instructing said external cellular positioning system further comprises transmitting an instruction message to said external cellular positioning system over a channel from said mobile terminal to said external cellular positioning system.

7. The method according to claim 6, wherein said channel is selected from the group consisting of a random access control channel, a fast access control channel, and a slow access control channel.

8. The method according to claim 6, wherein said instruction message is a short message of a short message service.

9. The method according to claim 5, wherein instructing said external cellular positioning system to engage and calculate the position of said mobile terminal is performed repeatedly.

10. The method according to claim 5, wherein instructing said external cellular positioning system to disengage when said external cellular positioning system is unable to calculate the position of said mobile terminal further comprises calculating which GPS satellites offer the highest probability for obtaining a first position fix, and sending information to said mobile terminal relating to which GPS satellites offer the highest probability for obtaining a first position fix.

11. The method according to claim 1, wherein said first positioning system is an internal positioning system and said second positioning system is an external positioning system.

12. The method according to claim 11, wherein said internal positioning system is an internal GPS receiver.

13. The method according to claim 11, wherein said external positioning system is an external cellular positioning system.

14. The method according to claim 11, wherein said external positioning system is an external cellular positioning system, and said internal positioning system is an internal GPS receiver.

15. The method according to claim 14, wherein instructing said external cellular positioning system to engage or disengage further comprises transmitting an instruction message to said external cellular positioning system over a channel from said mobile terminal to said external cellular positioning system.

16. The method according to claim 15, wherein said channel is selected from the group consisting of a random access control channel, a fast access control channel, and a slow access control channel.

17. The method according to claim 15, wherein said instruction message is a short message of a short message service.

18. The method according to claim 14, wherein instructing said external cellular positioning system to engage and calculate the position of the mobile terminal is performed repeatedly.

19. A mobile terminal usable in a cellular network, said mobile terminal comprising:
an internal positioning system which calculates, at the mobile terminal, a position of the mobile terminal using signals from satellites;
a transceiver for communicating via wireless signals with the cellular network, wherein the cellular network comprises an external positioning system which calculates, the position of the mobile terminal based on arrivals of the wireless signals at a plurality of base stations, said signals including data regarding the position of the mobile terminal as determined by at least one of the external and the internal positioning systems; and
a mobile terminal position controller, wherein said mobile terminal position controller determines the availability of one of the external and internal positioning systems, wherein said mobile terminal position controller selects the other of the positioning systems when said one positioning system is unavailable.

20. The mobile terminal of claim 19, wherein said mobile terminal position controller selects said internal positioning system when said internal positioning system is able to determine the position of said mobile terminal.

21. The mobile terminal of claim 19, wherein said mobile terminal position controller determines the position of said mobile terminal from the data included in said signal when said internal positioning system is unable to determine said position.

22. The mobile terminal of claim 19, further comprising a batter monitor, wherein the mobile terminal position controller selects the position of the mobile terminal from the data included in the signal when said battery monitor determines battery charge to be low.

23. The mobile terminal of claim 19, wherein said internal positioning system is a GPS receiver.

24. The mobile terminal of claim 19, wherein said wireless signals include data regarding the presence of external positioning systems in a cell of the cellular network which the mobile terminal is entering, and said mobile terminal position controller selects the position of the mobile terminal determined by the internal positioning system when said signal includes data indicating that no external positioning system is present in a cell of the cellular network which the mobile terminal is entering.

25. An external cellular positioning system for a cellular network, the external cellular positioning system comprising:
a plurality of cellular positioning receivers operable for monitoring transmissions from at least one mobile terminal, wherein the at least one mobile terminal comprises an internal positioning system which is operable to calculate, at the mobile terminal, using signals from satellites, a position for the at least one mobile terminal; and
a central positioning control site connected to the plurality of cellular positioning receivers, the central positioning control site operable to receive information regarding the transmissions from the plurality of cellular positioning receivers and calculate, at the central positioning control site, the position for the at least one mobile terminal, using the arrivals of the transmissions at the cellular positioning receivers;
wherein the external cellular positioning system is operable to receive over a channel and act on an instruction message from the at least one mobile terminal which selectively instructs the external cellular positioning system to engage and disengage based on the availability of the internal positioning system.

26. The system according to claim 25, wherein said channel is a random access control channel.

27. The system according to claim 25, wherein said channel is a fast access control channel.

28. The system according to claim 25, wherein said channel is a slow access control channel.

29. The system according to claim 25, wherein said instruction message is a short message of a short message service.

* * * * *